United States Patent
Khajavikhan et al.

(10) Patent No.: US 12,405,165 B2
(45) Date of Patent: Sep. 2, 2025

(54) WEYL SEMIMETAL INTEGRATED POLARIMETERS AND METHODS FOR MAKING THE SAME

(71) Applicant: University of Southern California, Los Angeles, CA (US)

(72) Inventors: Mercedeh Khajavikhan, Los Angeles, CA (US); Fugu Tian, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 224 days.

(21) Appl. No.: 18/460,389

(22) Filed: Sep. 1, 2023

(65) Prior Publication Data

US 2024/0418569 A1    Dec. 19, 2024

Related U.S. Application Data

(60) Provisional application No. 63/403,599, filed on Sep. 2, 2022.

(51) Int. Cl.
*G01J 4/04*    (2006.01)
(52) U.S. Cl.
CPC .................... *G01J 4/04* (2013.01)

(58) Field of Classification Search
CPC ........................................... G01J 4/04
See application file for complete search history.

(56) References Cited

U.S. PATENT DOCUMENTS

2002/0024704 A1 * 2/2002 Erdogan ............ H04B 10/2572
398/140

FOREIGN PATENT DOCUMENTS

WO    WO-2016178740 A2 * 11/2016 ................ G01J 4/02

OTHER PUBLICATIONS

Jia et al., "TaAs Weyl Semimetal Full-Stokes Integrated Polarimeter," 2022 Conference on Lasers and Electro-Optics (CLEO), San Jose, CA, USA, 2022, pp. 1-2. keywords: {Optoelectronic devices; Broadband communication; Electo-optic effects}. (Year: 2022).*
Ma et al., "TaAs Wely semimetal single-unit multi-port integrated polarimeter," 2023 Conference on Lasers and Electro-Optics (CLEO), San Jose, CA, USA, 2023, pp. 1-2. keywords: {Lasers and electro optics; Nanomaterials; Electrooptical waveguides;(120.5410) Polarimetry;(160.4236) Nanomaterials}, (Year: 2023).*

* cited by examiner

*Primary Examiner* — Mark R Gaworecki
(74) *Attorney, Agent, or Firm* — Nixon Peabody LLP

(57) ABSTRACT

Weyl semimetal-based polarimeters are disclosed that can uniquely map the polarization state of light on the Poincaré sphere.

20 Claims, 16 Drawing Sheets

WEYL SEMIMETAL INTEGRATED POLARIMETERS AND METHODS FOR MAKING THE SAME

CROSS-REFERENCE TO RELATED APPLICATIONS

The present application claims the benefit of and priority to U.S. Provisional Patent Application No. 63/403,599, entitled, "WEYL SEMIMETAL INTEGRATED 3-UNIT POLARIMETER AND METHOD FOR MAKING THE SAME" and filed on Sep. 2, 2022, the entire contents of which are hereby incorporated by reference herein in their entirety.

STATEMENT REGARDING FEDERALLY SPONSORED RESEARCH OR DEVELOPMENT

This invention was made with government support under Grant No(s). FA9550-20-1-0322 awarded by the Air Force Office of Scientific Research (AFOSR). The government has certain rights in the invention.

FIELD OF INVENTION

This invention relates to polarimeters.

BACKGROUND

Polarization carries vital information about light sources, bulk materials, and reflecting surfaces, enabling a broad spectrum of applications that range from chemistry and biology to earth sciences and astrophysics. The sharp rise of interest in remote sensing, imaging, and LiDAR in recent years has driven the demand for compact and high speed polarimeters to measure the state of polarization of incoming electromagnetic signals. Yet, as of now, many of the existing polarimetric designs suffer from several shortcomings, especially in the mid infrared (MIR) and infrared (IR) spectral ranges. The nature of polarimetry not only requires dividing an optical signal, either in time or in space, to measure various polarization components separately, but it also involves birefringent components for light helicity characterization, thus rendering the polarimeters bulky, sometimes even with rotating parts.

Decades of development in nanotechnology has enabled new families of more compact polarimeters based on innovative metasurface structures that operate as ultracompact polarization filters. For example, a two-dimensional dielectric metasurface unit cell can be designed that is capable of analyzing four polarization states, which indicates a path to realizing many polarization devices in parallel using a single optical element. However, these state-of-the-art configurations tend to exhibit undesired scattering losses and limited spectral bandwidths. In addition, they usually require ~4 to 6 polarization component sensing units in order to function, and often rely on additional far-field photodetectors for electric signal generation, thus compromising the aforementioned size advantage.

Accordingly, needs exist for polarimeters that do not suffer from the above issues and shortcomings.

All publications herein are incorporated by reference to the same extent as if each individual publication or patent application were specifically and individually indicated to be incorporated by reference. The following description includes information that may be useful in understanding the present invention. It is not an admission that any of the information provided herein is prior art or relevant to the presently claimed invention, or that any publication specifically or implicitly referenced is prior art.

DESCRIPTION OF THE INVENTION

All references cited herein are incorporated by reference in their entirety as though fully set forth. Unless defined otherwise, technical and scientific terms used herein have the same meaning as commonly understood by one of ordinary skill in the art to which this invention belongs.

Aspects of the present disclosure include a Weyl semimetal employed in integrated and compact polarimetric detection systems. In this respect, as one example of a Weyl semimetal, a tantalum-arsenic (TaAs) based polarimeter is disclosed that uses sensing units that can uniquely map the polarization state on the Poincaré sphere.

Aspects of the present disclosure include a 3-unit integrated polarimeter featuring grating-based wave plates and Weyl semimetal, such as TaAs, thin slides that are capable of directly measuring full Stokes parameters. The 3-unit integrated polarimeter offers several advantages, which include ultracompact form factor (without requiring additional photodetectors), high speed, and broadband operation. Furthermore, the 3-unit integrated polarimeter design provides the ability to exploit materials with polarization dependent photocurrents in optoelectronic applications.

Aspects of the present disclosure include an integrated polarimeter that includes three or fewer Weyl semimetal sensing units; and two or fewer integrated grating-based wave plates. Each one of two of the three or fewer Weyl semimetal sensing units is on a separate one of the two or fewer integrated grating-based wave plates.

Further aspects of the present disclosure include the Weyl semimetal being tantalum-arsenic. Further aspects of the present disclosure include the integrated grating-based wave plates being silicon on silicon dioxide. Further aspects of the present disclosure include the integrated grating-based wave plates being patterned and etched on the silicon on silicon dioxide. Further aspects of the present disclosure include the integrated grating-based wave plates having different effective refractive indexes for transverse electric waves and transverse magnetic waves. Further aspects of the present disclosure include each one of the three or fewer Weyl semimetal sensing units being a 35 µm long TaAs thin slide, and each one of the two or fewer integrated grating-based wave plates being a 2-µm-period grating underneath. Further aspects of the present disclosure include the polarimeter having pairs of electrodes. Each one of the three or fewer Weyl semimetal sensing units extends between a separate one of the pairs of electrodes. Further aspects of the present disclosure include the a-c plane of Weyl semimetal crystal structure of the three or fewer Weyl semimetal sensing units being oriented on a substrate surface such that an axis a is along a line connecting the pairs of electrodes. Further aspects of the present disclosure include the two or fewer integrated grating-based wave plates being 45° rotated with respect to each other. Further aspects of the present disclosure include the polarimeter having three Weyl semimetal sensing units. Further aspects of the present disclosure include the polarimeter having one Weyl semimetal sensing units.

Aspects of the present disclosure include a method of forming a Weyl semimetal sensing unit. The method includes milling a Weyl semimetal slide; transferring the milled Weyl semimetal slide to a thermally grown silicon dioxide on silicon substrate using a focused ion beam technique; and electrically bridging with platinum the transferred Weyl semimetal slide on the silicon dioxide on silicon substrate to electrodes.

Aspects of the present disclosure include a single-unit multi-port integrated polarimeter including a substrate and a Weyl semimetal slide on the substrate. The Weyl semimetal slide has at least four arms. The integrated polarimeter further includes a plurality of electrodes on the substrate. Each electrode is associated with a separate arm of the at least four arms of the Weyl semimetal slide. The integrated polarimeter further includes conductive welds separately connecting the plurality of electrodes to the at least four arms.

Further aspects of the present disclosure include the substrate being silicon oxide on silicon substrate. Further aspects of the present disclosure include the Weyl semimetal being fabricated as a snow-flake shape. Further aspects of the present disclosure include the Weyl semimetal being tantalum-arsenic. Further aspects of the present disclosure include the at least four arms being eight arms. Further aspects of the present disclosure include the eight arms being evenly radially spaced apart. Further aspects of the present disclosure include the plurality of electrodes being six electrodes. Further aspects of the present disclosure include two of the eight arms being not connected directly to any one of the six electrodes.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

Figure 1:
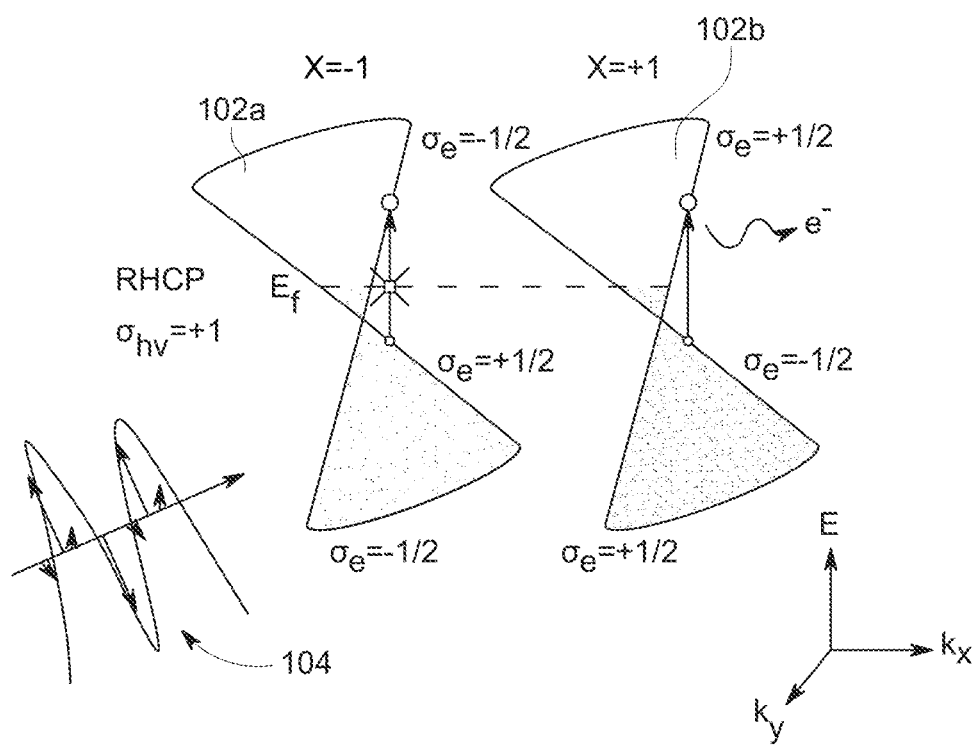
FIG. 1 shows a circular photogalvanic effect (CPGE) current generated from Weyl cones from a right-hand circularly polarized (RHCP) incident light, according to aspects of the present disclosure.

Before the present compounds, compositions, articles, devices, and/or methods are disclosed and described, it is to be understood that they are not limited to specific synthetic methods unless otherwise specified, or to particular reagents unless otherwise specified, as such may, of course, vary. It is also to be understood that the terminology used herein is for the purpose of describing particular embodiments only and is not intended to be limiting.

As utilized herein, "and/or" means any one or more of the items in the list joined by "and/or." As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g." and "for example" set off lists of one or more non-limiting examples, instances, or illustrations.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that when a value is disclosed that "less than or equal to" the value, "greater than or equal to the value" and possible ranges between values are also disclosed, as appropriately understood by the skilled artisan. For example, if the value "10" is disclosed the "less than or equal to 10" as well as "greater than or equal to 10" is also disclosed. It is also understood that the throughout the application, data is provided in a number of different formats, and that this data, represents endpoints and starting points, and ranges for any combination of the data points. For example, if a particular data point "10" and a particular data point 15 are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

"Comprising" is intended to mean that the devices, compositions, methods, etc. include the recited elements, but do not exclude others. "Consisting essentially of" when used to define compositions and methods, shall mean including the recited elements, but excluding other elements of any essential significance to the combination. Thus, a composition consisting essentially of the elements as defined herein would not exclude trace contaminants from the isolation and purification method and pharmaceutically acceptable carriers, such as phosphate buffered saline, preservatives, and the like. "Consisting of" shall mean excluding more than trace elements of other ingredients and substantial method steps for administering the compositions provided and/or claimed in this disclosure. Embodiments defined by each of these transition terms are within the scope of this disclosure.

Relational terms such as "first" and "second" and the like may be used solely to distinguish one entity or action from another, without necessarily requiring or implying any actual relationship or order between them.

Illustrative embodiments are now described. Other embodiments may be used in addition or instead. Details that may be apparent to a person of ordinary skill in the art may have been omitted. Some embodiments may be practiced with additional components or steps and/or without all of the components or steps that are described.

The details of one or more embodiments of the invention are set forth in the accompanying drawings and the description below. Other features, objects, and advantages of the invention will be apparent from the description and drawings, and from the claims.

Aspects of the present disclosure concern optoelectronic properties of Weyl semimetals (WSMs) within integrated polarimeters that are capable of directly measuring the Stokes parameters. In one or more embodiments, the WSM is TaAs, a prototypical Type I WSM. Using its exotic optoelectronic properties originating from the circular photogalvanic effect (CPGE), shift currents, and the photo thermoelectric effect (PTE), an ultra-compact polarimeter based on TaAs sensing units, accompanied by or independent of integrated grating-based wave plates, is disclosed. The full Stokes parameters can then be extracted by inverting the measured currents.

Weyl Fermions (WF) are massless chiral particles that were first theoretically predicted in quantum field theory in 1929 by H. Weyl. Although as of now, no fundamental particle in high-energy physics is identified as WFs, condensed matter researchers have found an analogue of this elusive particle in a new class of topological materials, known as Weyl semimetals. Recent years have witnessed a flurry of activities aiming to understand the optical properties of WSMs. In this respect, phenomena arising from circular photogalvanic effects (CPGEs), shift currents, spatially dispersive circular photogalvanic processes (s-CPGEs), and orbital photogalvanic effects (OPGEs) have been systematically explored. In general, circular photogalvanic or bulk photovoltaic effects arise upon illumination of a crystal that lacks inversion symmetry, a process that leads to induced photogalvanic currents that are directly dependent on the polarization state of the incident light. In this case, the photogalvanic current is governed by a third-rank photogalvanic tensor Dijk, the elements of which relate the PGE currents to the polarization state of light.

The polarization dependent photocurrent in TaAs slides provides a unique opportunity to realize ultracompact direct polarimetric measurement units. The polarization state P of an electromagnetic wave can be fully determined by its corresponding 4-vector Stokes parameters $S=[S_0, S_1, S_2, S_3]$. Here, $S_0=I$ represents the total light intensity, $S_1=I_0-I_{90}$ describes the difference between 0° and 90° linear polarizations, $S_2=I_{45}-I_{135}$ denotes the difference between 45° and 135° linear polarizations, and $S_3=IR-IL$ depends on the difference between right and left circular polarization components. For fully polarized light, $S_1$, $S_2$, and $S_3$ can be normalized to $S_0=\sqrt{(S_1^2+S_2^2+S_3^2)}$ and form a 3D vector $\vec{S}=(S_1\vec{x}+S_2\vec{y}+S_3\vec{z})/S_0$ which is known as the state of polarization (SOP). This 3D vector uniquely positions the polarization state of light on the Poincaré sphere.

As discussed further below, when a Weyl semimetal, such as TaAs, is correctly mounted, it displays a photocurrent difference between two orthogonal linear (0° and) 90° as well as circular (left and right) polarization components. This naturally results in non-zero $S_1$ and $S_3$ components. At the same time, the DC contribution of the photocurrent is strictly proportional to light intensity.

FIG. 1 schematically shows the underlying mechanism of circular photogalvanic effect (CPGE) in Weyl semimetals, upon which the present disclosure relies. FIG. 1 includes two Weyl cones 102*a* and 102*b* with chirality of −1 & +1. The Weyl cones 102*a* and 102*b* are particular parts of the band structure of a Weyl semimetal. Element 104 is incident light with right-hand circular polarization. Elements $\sigma_{hv}$ represents the spin number of the light 104, $\sigma_e$ represents the spin number of the electron e– the arrow represents the electron transition, the e-represents the electron excited to the conduction band, $E_f$ represents the fermi energy level, and $k_x$, $k_y$, and E: represent the dimensions of the Weyl cones 102*a* and 10*b*. Specifically, $k_x$ and $k_y$ are wave numbers along x and y direction, and E is the energy. The transition in the Weyl cone 102*a* is forbidden under illumination of (right-hand circular polarization) RHCP light, while in the Weyl cone 102*b* the transition is allowed.

The conservation of spin angular momentum requires a photon of the light 104 with a definite helicity (e.g., right-hand circular polarization) to only induce a transition for an electron with a particular spin (e.g., −½) locating on one side of the cone 102a/102b. Even though the Weyl cones 102a/102b always appear in pairs with opposite chirality, the symmetry breaking nature of Weyl semimetals results in a net non-zero current flowing in a direction that closely depends on the helicity of the incoming light. Besides excited by circular polarization, Weyl semimetals, such as TaAs, also respond to linear polarization. For example, in a properly mounted TaAs slide sample, the dichroic absorption along two crystalline axes can result in a linear polarization dependent photothermal current via Seebeck effects.

Figure 2:
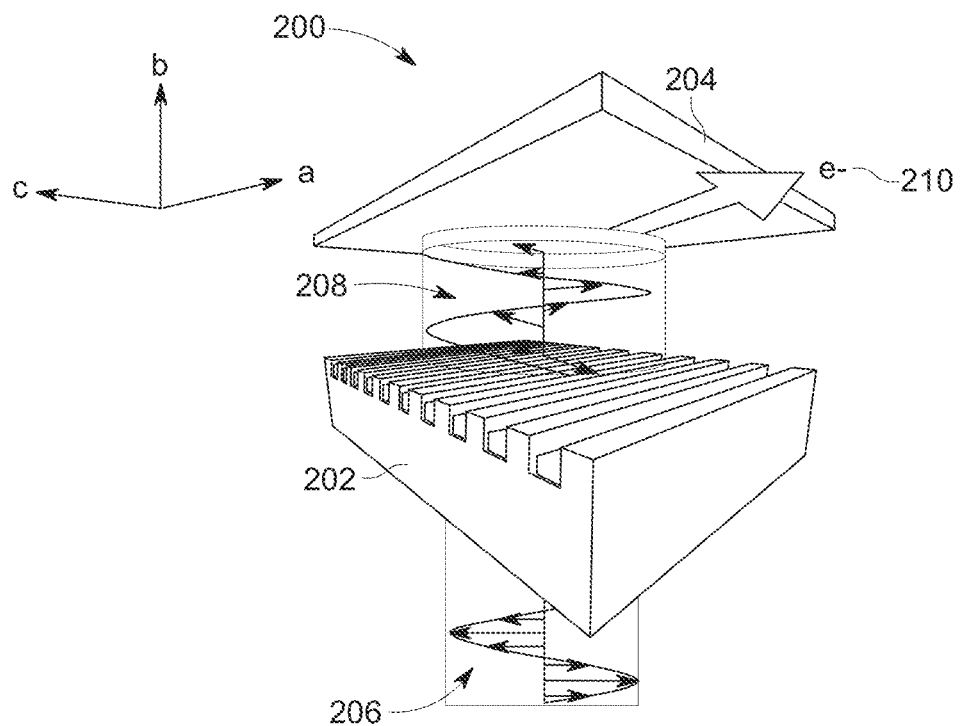
FIG. 2 shows a schematic of one Weyl semimetal sensing unit, according to aspects of the present disclosure.

FIG. 2 shows a schematic view of the structural architecture of a Weyl semimetal sensing unit 200, according to aspects of the present disclosure. According to some embodiments, the Weyl semimetal sensing unit 200 can include a grating-based wave plate 202 and a Weyl semimetal slide 204, such as a TaAs slide. According to some embodiments, and as shown in FIG. 2, the grating-based wave plate 202 can be incorporated under the Weyl semimetal slide 204, thus allowing incident light 206 to enter from the back of the grating-based wave plate 202 (bottom in FIG. 2) before striking the Weyl semimetal slide 204. However, according to other embodiments, and as disclosed further below, Weyl semimetal sensing units of the present disclosure do not need a grating-based wave plate.

The grating-based wave plate 202 can be patterned and etched on a thermal oxide, such as a silicon/silicon dioxide. The phase retardation of the incoming light 206 depends on the duty cycle and the etching depth of the grating-based wave plate 202.

The light 206 passes through the grating-based wave plate 202 and becomes the light 208 with altered polarization on the other side. The light 208 strikes and excites the Weyl semimetal slide 204, which generates current, as represented by the electron 210.

Figure 3:
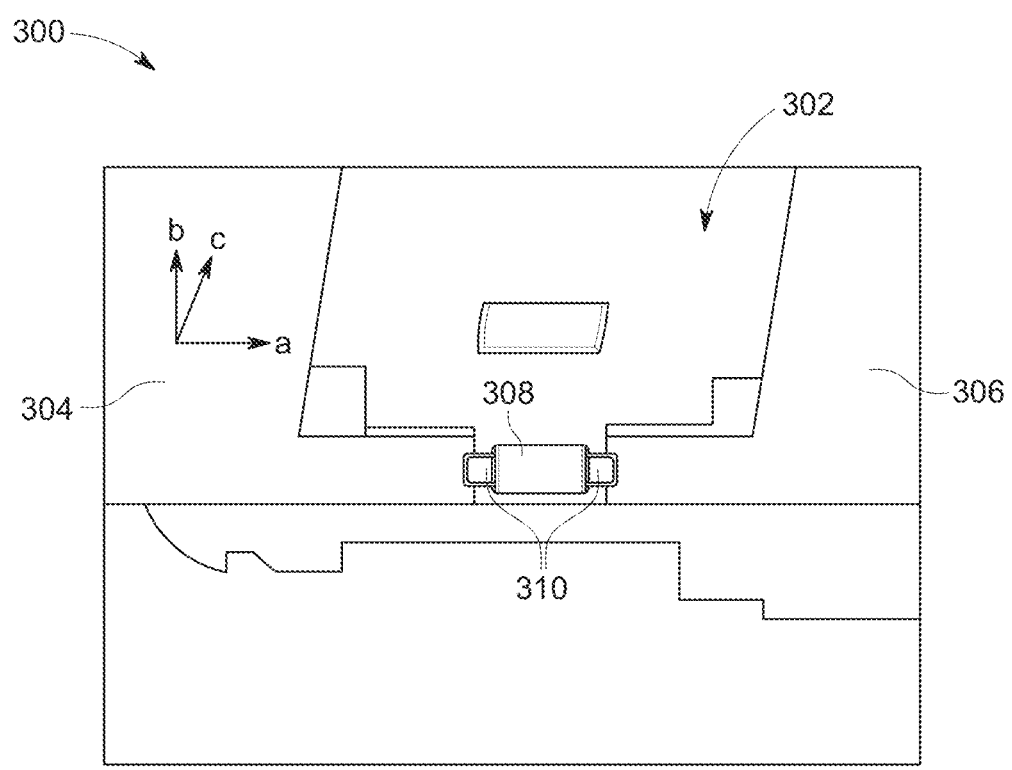
FIG. 3 shows a scanning electron microscopic image of a Weyl semimetal sensing unit, according to aspects of the present disclosure.

Referring now to FIG. 3, shown is a perspective view of a Weyl semimetal sensing unit 300, according to aspects of the present disclosure. The Weyl semimetal sensing unit 300 includes a silicon substrate 302. The silicon substrate 302 can be formed of, for example, silicon/silicon dioxide. The thickness of the silicon substrate 302 can be, for example, about 200 nanometers (nm) thick of silicon dioxide on a silicon layer below. However, the thickness can vary and be, for example, several hundred nanometers to several micrometers.

Formed on the substrate 302 are electrodes 304 and 306. Both of the electrodes 304 and 306 are formed of a layer of chromium (Cr) on top of the silicon substrate 302 (specifically the silicon dioxide), followed by a layer of gold (Au) on top of the layer of chromium. However, the electrodes 304 and 306 can be made by any highly materials. The electrodes 304 and 306 are connected to pre-amplifier (not shown) and then to lock-in amplifier (not shown).

A Weyl semimetal, such as TaAs, slide 308 forms a bridge between the electrode 304 and 306. The Weyl semimetal slide 308 can be about 10 by 10 micrometers (μm) wide and long, respectively, and about 400 nm thick. However, the dimensions of the length and width can be at the micrometer scale, and the thickness can vary from hundreds of nanometers to several micrometers thick.

The Weyl semimetal slide 308 characterizes a polarization dependent photocurrent. The Weyl semimetal slide 308 can be milled and transferred to the silicon substrate 302 using, for example, a focused ion beam (FIB) technique. Thereafter, the Weyl semimetal slide 308 can be electrically bridged using platinum (Pt) welds 310 to connect to the electrodes 304 and 306.

To meet the requirement of symmetry breaking for Weyl semimetals, the a-c plane of the crystal structure of, for example, TaAs slide used as the Weyl semimetal slide 308 is placed on the silicon substrate 302 such that the crystal axis a is along the line connecting the two electrodes, as represented by the axes a, b, c shown in FIG. 3.

Figure 4:
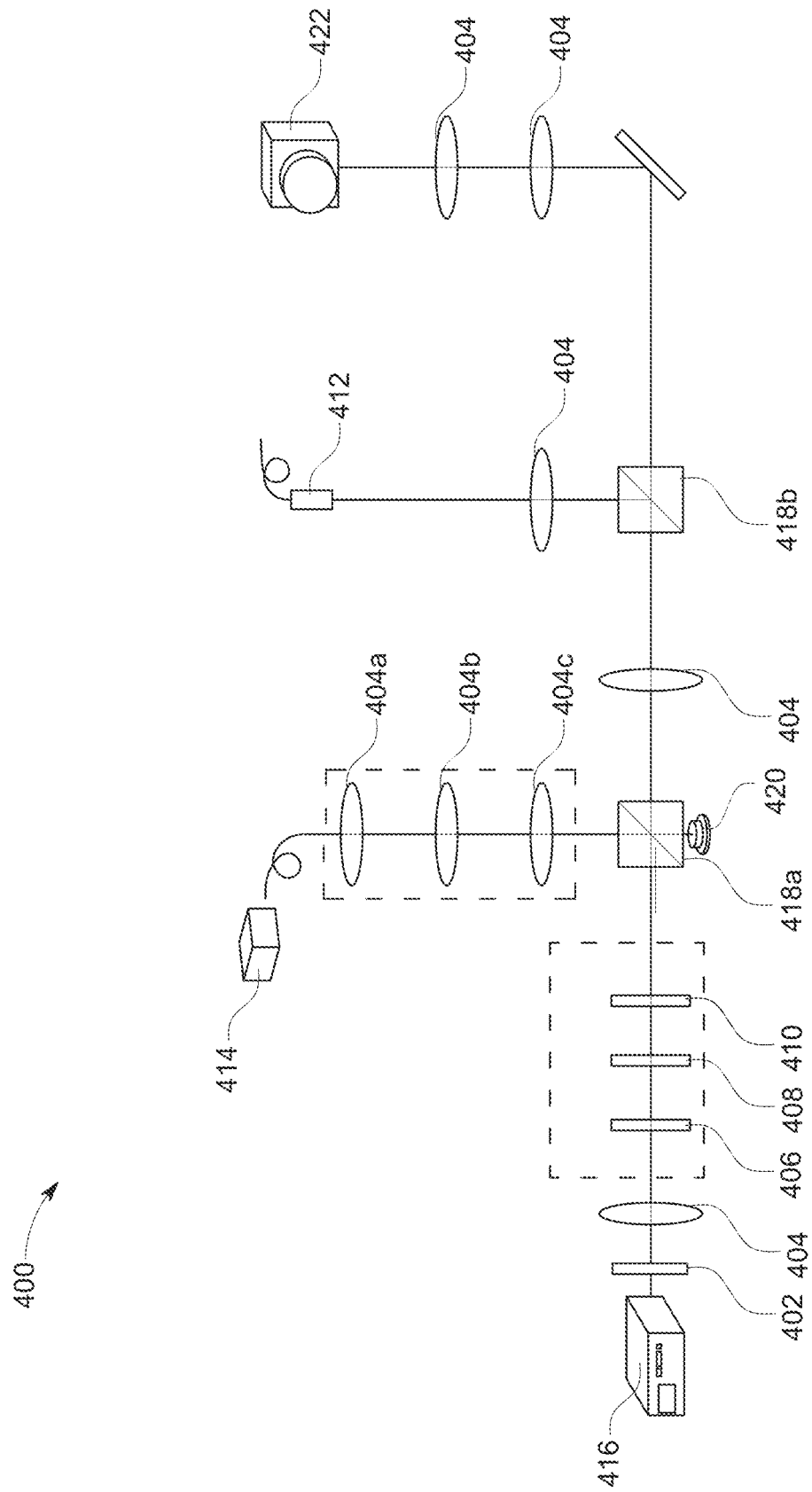
FIG. 4 shows a confocal imaging system for optoelectronic measurements, according to aspects of the present disclosure.

FIG. 4 shows a confocal imaging system 400 for optoelectronic measurements, according to aspects of the present disclosure. The sample, represented by element 402, is a Weyl semimetal slide 308 surface. The ellipses 404 (including ellipses 404a-440c) are lenses. The elements 406 and 408 are quarter and half wave plates, respectively. Element 410 is a linear polarizer. Element 412 is an incoherent light source for imaging the sample 402. Element 414 is a laser is at 1550 nm and is used to carry polarization states and excite photocurrents. The laser 414 is modulated by an acoustic optical modulator or a chopper (not shown in the figure) at a specific frequency. Element 416 is a lock-in amplifier used to measure the currents that are exactly at the modulation frequency of laser 414.

Light from the laser 414 is calibrated through three lenses 404a-404c, passes through a beam splitter 418a (i.e., half passes into a power detector 420 to measure beam power), then passes through polarization control optics (i.e., the quarter wave plate 406, the half wave plate 408, and the linear polarizer 410) to alter to specific polarization states, and hits the sample 402. Some of the reflecting light from the sample 402 passes back to the camera 422. For the light from the incoherent light source 412, it passes to the beam splitter 418b, to the sample 402, and reflected components from the sample 402 propagate to the camera 422 to form the image of the sample.

Figure 5:
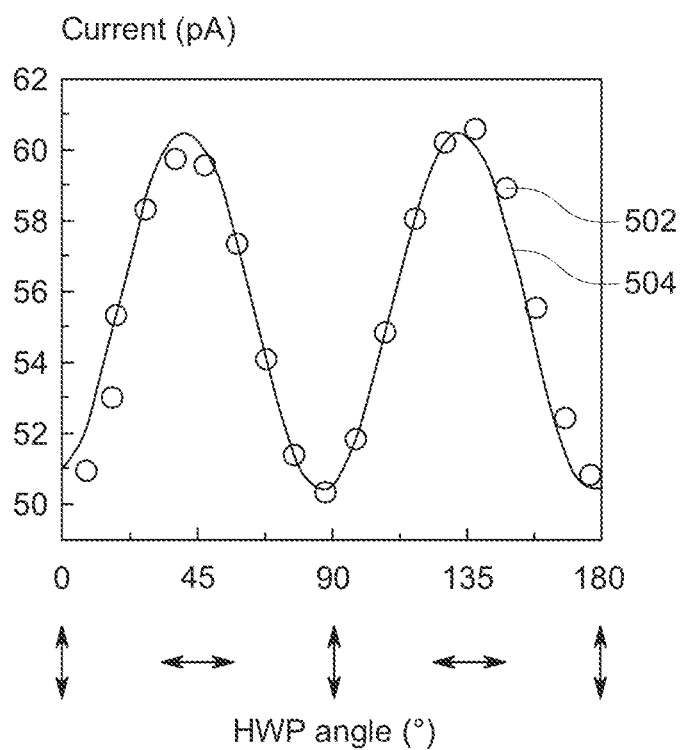
FIG. 5 shows a plot of current measurements generated by a Weyl semimetal sensing unit, according to aspects of the present disclosure.

FIG. 5 shows a plot 500 of the linear polarization dependent photocurrent from the Weyl semimetal sensing unit 300 being tested in the setup of FIG. 4. Since a half wave plate (HWP) changes the direction of linear polarization twice as much as its own rotating angle, a combination of a polarizer and a rotating HWP shifts the direction of linear polarization between vertical and horizontal for every 45° rotation. The dots 502 in FIG. 5 show the recorded current when the Weyl semimetal slide 308 was excited using a beam with a power of 0.71 milliwatt (mW), demonstrating a periodic photocurrent with a 10.5 picoamps (pA) differential between the vertical and horizontal linear polarizations. To this end, the measured linear polarization dependent photocurrent was fitted using a sinusoidal function with a DC bias, and plotted in FIG. 5 as the curve 504. This photocurrent was partially attributed to the absorption difference between the two linear polarizations that results in polarization dependent thermoelectric current components. The measured linear and circular dichroisms are listed below in Table 1.

TABLE 1

Dichroism measurement on TaAs at 2.14 mW

| | Transmitted power at different position (μW) | | |
|---|---|---|---|
| Input polarization | Left | Middle | Right |
| Horizontal linear | 3.32 | 3.14 | 3.16 |
| Vertical linear | 3.71 | 3.52 | 3.52 |
| Left hand circular | 3.30 | 3.12 | 3.14 |
| Right hand circular | 3.31 | 3.13 | 3.15 |

For these measurements, light with various polarization states was focused at different positions on the Weyl semimetal slide 308 (FIG. 3). In the vicinity of each position, three independent measurements were conducted to ensure the consistency of the sample responses.

Figure 6:
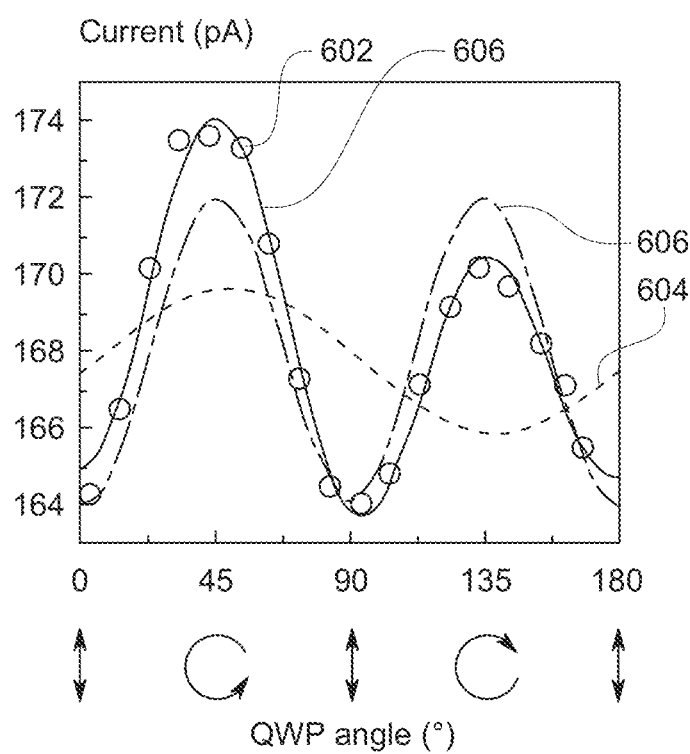
FIG. 6 shows a plot of current measurements generated by a Weyl semimetal sensing unit, according to aspects of the present disclosure.

Similarly, FIG. 6 shows a plot 600 of the circular polarization dependent photocurrent observed in the Weyl semimetal slide 308 (FIG. 3). Here, a combination of a polarizer and a quarter wave plate (QWP) were used to realize the desired polarization states. When incident with a linearly polarized light, the QWP (placed at 45° or) 135° changed the beam's polarization to either left or right circular while preserving the original state of polarization when its axis was parallel to the incident linear polarization direction.

The measured photocurrents are represented by the dots 602 in FIG. 6. The Weyl semimetal slide 308 under an incident beam with a power of 2.14 mW reached the maximum of 173.9 pA under left circularly polarized light illumination, but was only 170.1 pA under right circular polarization. FIG. 6 reveals that, in this case, three components were contributing to the generated current: a DC bias current ($I_{DC}$), a linear polarization dependent current ($I_l$), and a circular polarization dependent component ($I_c$). The linear polarization component experienced a full period within 90° of QWP rotation, while the circular polarization component required a 180° rotation in a cycle.

The measured data was fit with a three-component periodic current generation function as follows:

$$I = I_{DC} + I_c \sin(2\theta + \phi_1) + I_l \sin(4\theta + \phi_2) \quad \text{(Eq. 1)}$$

to find the contribution from various effects, where θ was the rotation angle of the wave plate and $\phi_1(\phi_2)$ were the phase shift of the circular (linear) polarization dependent components, respectively. The dashed curve 604 in FIG. 6 shows the circular polarization dependent component (plotted as $I_{DC}+I_c$), focusing solely on the photocurrent difference under left and right circularly polarized light. The dot-dash curve 606 displays the crystal axes induced linear polarization dependent component. Similar to the argument provided in the case of linear polarization, the origin of the observed circular polarization dependent photocurrent was partially attributed to the circular polarization dependent Seebeck effect through the measured circular dichroism (which is indeed very small) as well as circular photogalvanic effect due to the unique band structure of WSMs.

Equation 1 can be normalized and rewritten as $$I' = (1-\gamma)S_3 + \gamma S_1 \quad \text{(Eq. 2)}$$

where γ is a fitting parameter, representing the component contrast ratio between the linear and circular polarization response. Utilizing this unique relationship between photocurrent and Stokes parameters, the integrated polarimeters of the present disclosure generate three distinct SOPs from an incident optical signal, thus solving for the polarization Stokes parameters with only three photocurrent measurements. A wave plate with a 4×4 Mueller Matrix M can transform the original incident light with Stokes parameters S into S'=[S'$_0$, S'$_1$, S'$_2$, S'$_3$]=MS, where S'$_{1,2,3}$ is related to both wave plate M and the original Stokes parameters S. In the present polarimeter design based on three sensing units, differently oriented gratings serve as wave plates on two of the units, with each imposing π/2 retardation. It should be noted that the absolute value of retardation does not matter as long as it is incorporated in the Mueller Matrix M, and it is not too small to make the polarization variations negligible. Indeed, the retardation of the grating can be other values besides pi/2. However, the value should not be too small, or the polarization variation from the grating will be negligible. Typically, it can be between 20 degrees and 160 degrees.

In addition to the amount of retardation, the orientation of the grating-based wave plate with respect to the polarization of the incident light ultimately determines the output state of polarization. The wave plates $M_1$, $M_2$ and the Stokes parameter S of the incident light yields three different photocurrents $I_1$, $I_2$, $I_3$ from the three units, following Equation 2. After calibrating the wave plates $M_1$, $M_2$ and the Weyl semimetal (e.g., TaAs) current component contrast ratio parameter γ, rewriting Eq. (2) in matrix form as I=[$I_1$, $I_2$, $I_3$]=M'[$S_1$, $S_2$, $S_3$], where M is the coefficient matrix with constants generated by the Mueller matrix for gratings and γ, one can find the normalized Stokes parameters of the incident light from these three distinct measured currents through solving the equation set formed by Equation 2.

Figure 7:
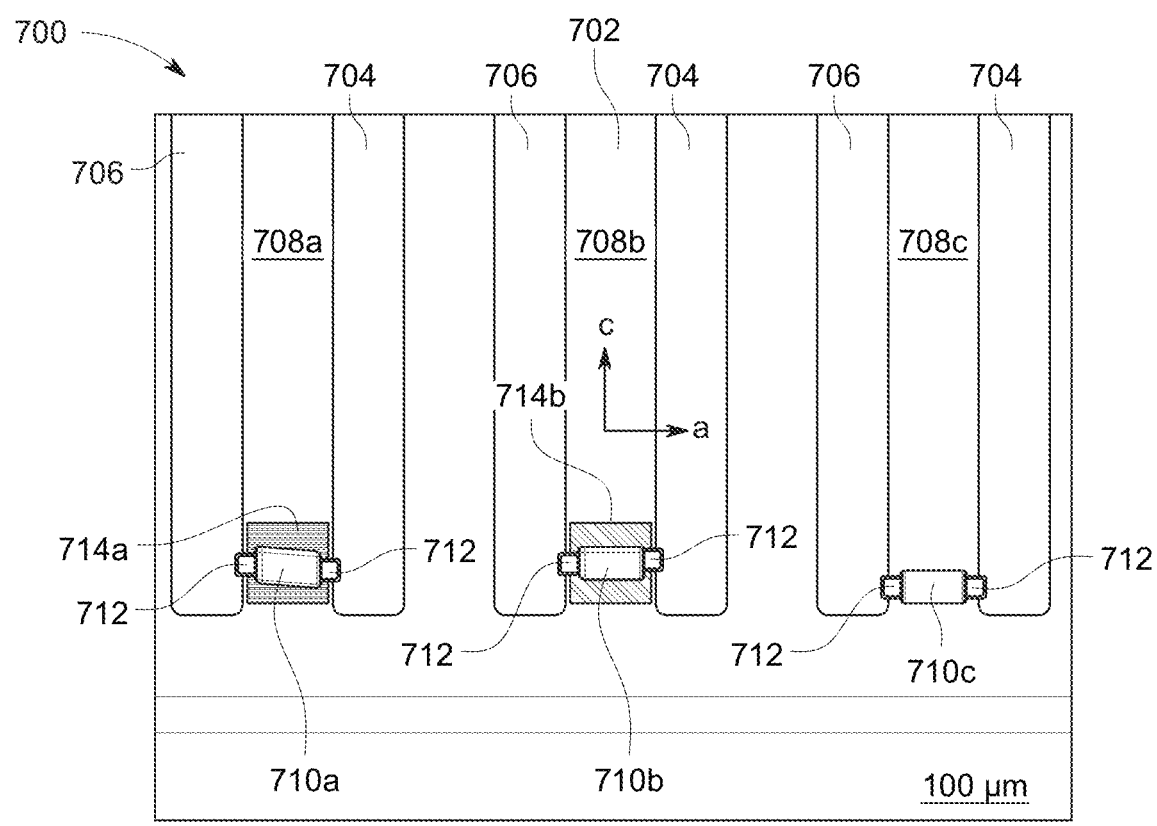
FIG. 7 shows a top view of a 3-unit integrated polarimeter, according to aspects of the present disclosure.
Figure 8:
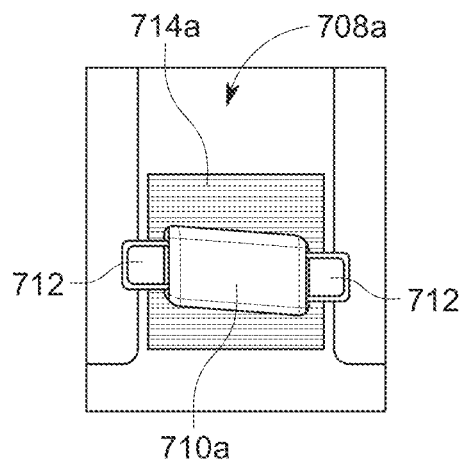
FIG. 8 shows a detailed view of a sensing unit from the 3-unit integrated polarimeter of FIG. 7, according to aspects of the present disclosure.
Figure 9:
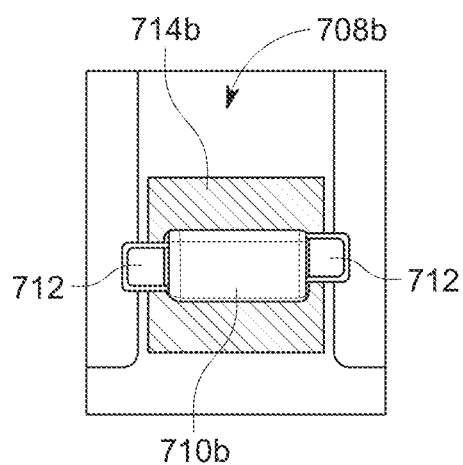
FIG. 9 shows a detailed view of another sensing unit from the 3-unit integrated polarimeter of FIG. 7, according to aspects of the present disclosure.
Figure 10:
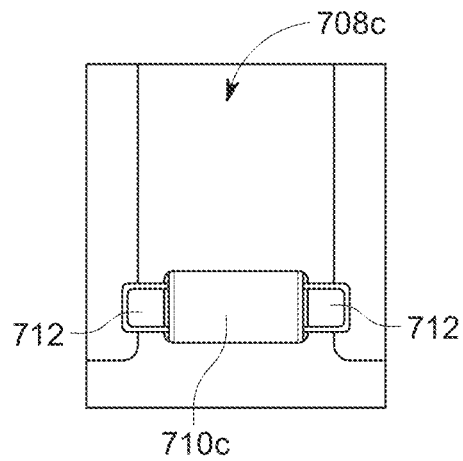
FIG. 10 shows a detailed view of another sensing unit from the 3-unit integrated polarimeter of FIG. 7, according to aspects of the present disclosure.

FIG. 7 shows a top view of a 3-unit integrated polarimeter 700, according to aspects of the present disclosure. FIGS. 8-10 show detailed views of Weyl semimetal sensing units 708a-708c, respectively, of the 3-unit integrated polarimeter 700 in FIG. 7, according to aspects of the present disclosure.

Referring to FIG. 7, the 3-unit integrated polarimeter 700 includes a substrate 702, which, as discussed above, can be formed of silicon/silicon dioxide, as disclosed above. Formed on the substrate 702 are electrodes 704 and 706, which are similar to the electrode 304 and 306 discussed above for being made of, for example, gold on chromium, which are arranged in pairs corresponding to each separate Weyl semimetal sensing unit 708a-708c. The electrodes 704 and 706 are connected to a pre-amplifier and then to the lock-in amplifier (not shown).

Spanning between the pairs of the electrode 704 and the electrode 706 are Weyl semimetal slides 710a-710c, corresponding to the Weyl semimetal sensing units 708a-708c, respectively. In the embodiment shown in FIG. 7, the Weyl semimetal slides 710a-710c are formed of TaAs and are about 35 µm long. However, their lengths can vary from this specific distance. Platinum welds 712 connect the Weyl semimetal slides 710a-710c to the respective electrodes 704 and 706.

Below the Weyl semimetal slides 710a and 710b are grating-based wave plates 714a and 714b, respectively. The grating-based wave plates 714a and 714b have 2-µm-period gratings; however, the periods of the gratings can vary. For example, the period depends on the material, incident wavelength, thickness. Generally, any transmissive gratings that can generate sufficient retardation can be applied. The period can be several hundred nanometers to a few micrometers at the wavelength of 1550 nm. The grating-based wave plates 714a and 714b are 45° rotated with respect to each other in order to create two distinct states of polarization (SOPs). The grating-based wave plates 714a and 714b can function as birefringent layers by having different effective refractive indexes for the transverse electric (TE) wave and the transverse magnetic (TM) wave. The grating-based wave plates 714a and 714b provide a retardation of 80° at 1550 nm.

Figure 12:
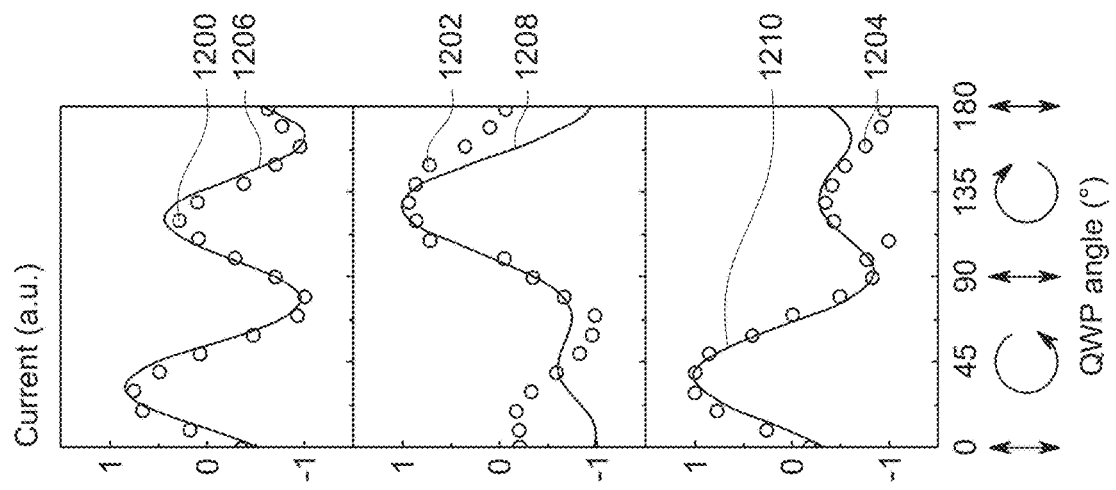
FIG. 12 shows plots of measured photocurrent responses with a rotating quarter-wave plate (QWP) for each of the sensing units in FIGS. 8-10, according to aspects of the present disclosure.
Figure 11:
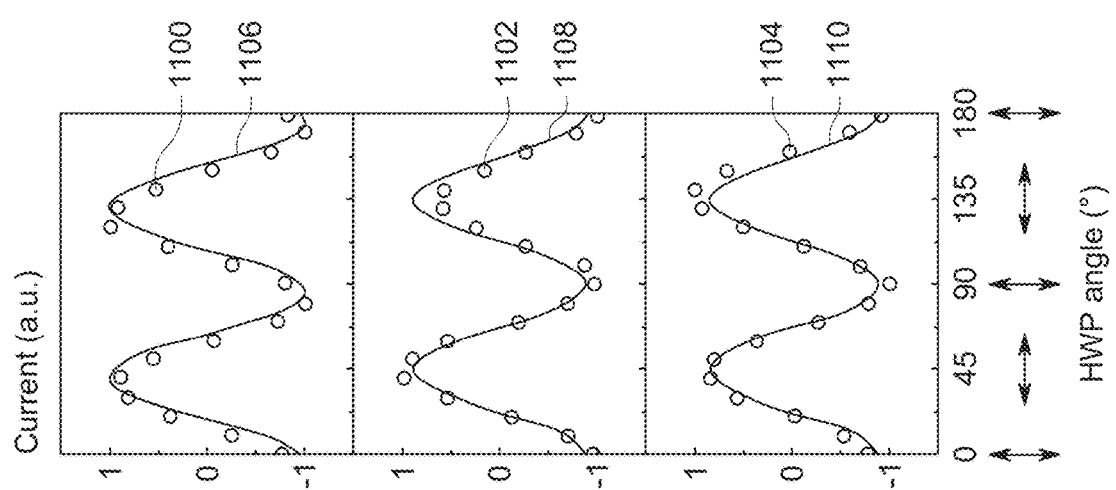
FIG. 11 shows plots of measured photocurrent responses with a rotating half-wave plate (HWP) for each of the sensing units in FIGS. 8-10, according to aspects of the present disclosure.

The 3-unit integrated polarimeter 700 of FIG. 7 was characterized using a similar setup as shown in FIG. 4. FIG. 11 shows points 1100-1104 of measured photocurrent responses with rotating half-wave plate (HWP) for each of the sensing units in FIGS. 8-10, with points 1100 associated with the curve 1106 representative of Weyl semimetal sensing unit 708a, points 1102 associated with the curve 1108 representative of Weyl semimetal sensing unit 708b, and points associated with the curve 1110 representative of Weyl semimetal sensing unit 708c, according to aspects of the present disclosure. Similarly, FIG. 12 shows points 1200-1204 of measured photocurrent responses with rotating quarter-wave plate (QWP) for each of the sensing units in FIGS. 8-10, with points 1200 associated with the curve 1206 representative of Weyl semimetal sensing unit 708a, points 1202 associated with the curve 1208 representative of Weyl semimetal sensing unit 708b, and points 1204 associated with the curve 1210 representative of Weyl semimetal sensing unit 708c, according to aspects of the present disclosure. The indicators in FIGS. 11 and 12 under the horizontal axes represent the polarization of the incident beam.

To validate the polarimetric system, a Mueller Matrix based numerical model was established to simulate photocurrent generation from each of the sensing units using the measured grating-based retardation. The simulated currents plotted in the curves 1106-1110 of FIG. 11 and curves 1206-1210 in FIG. 12 closely follow the measurement observations. These results confirm the functionality of the grating-based wave plates and the architecture design of the polarimeter.

Figure 13:
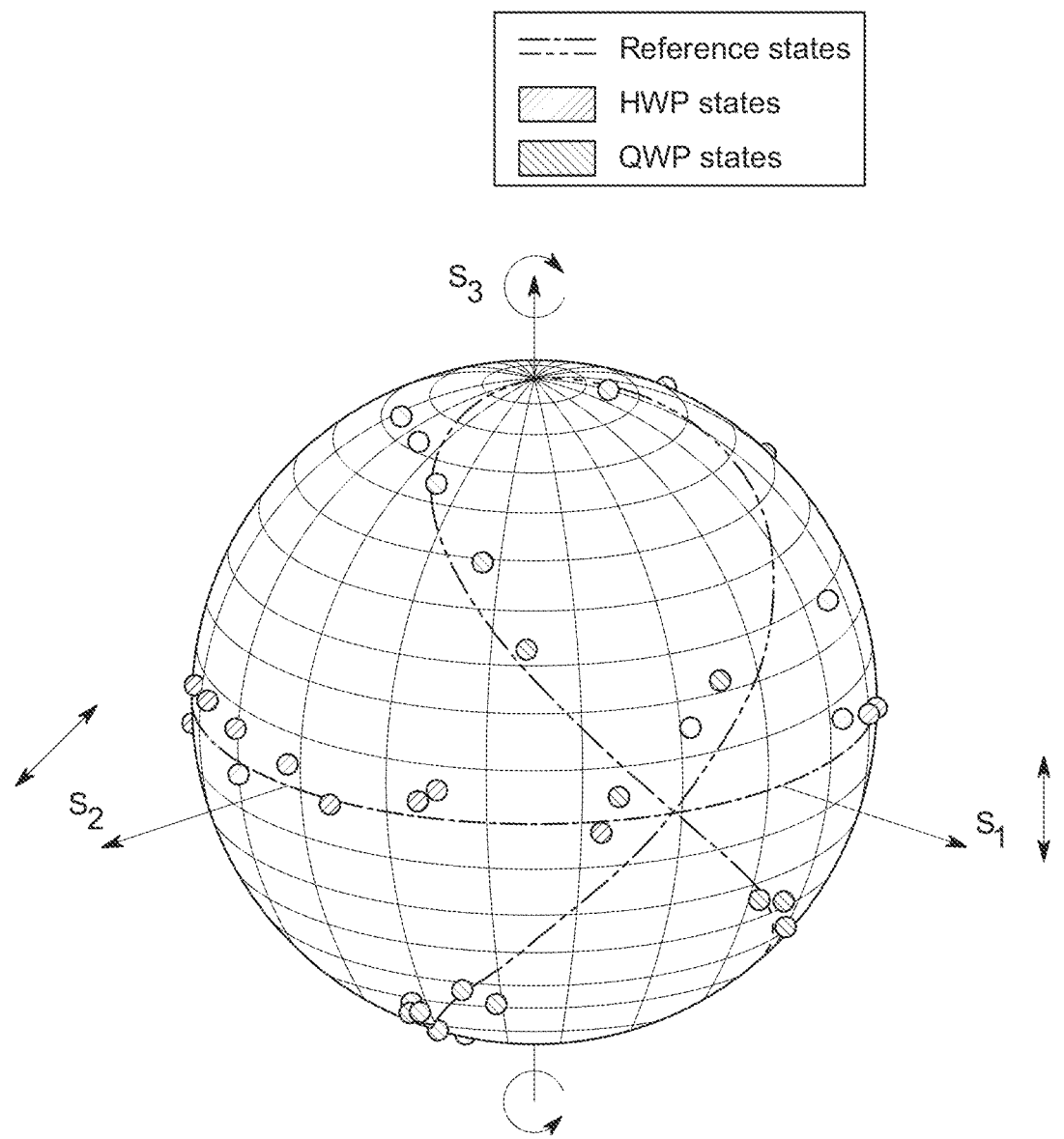
FIG. 13 shows measured polarization states on a Poincaré Sphere calculated from recorded current signals, according to aspects of the present disclosure.

In order to validate the polarimetric capability of the 3-unit integrated polarimeter 700, the measured current data of FIGS. 11 and 12 was inserted into the polarimeter model and incident Stokes parameters were calculated. FIG. 13 shows the measured SOPs versus the reference polarization status on a Poincaré Sphere. The polarization states measured with a rotating QWP/HWP are indicated with dots/squares, respectively, and the corresponding reference polarization states of the incident light are marked with dash/dash-dot curves, respectively.

Figure 14:
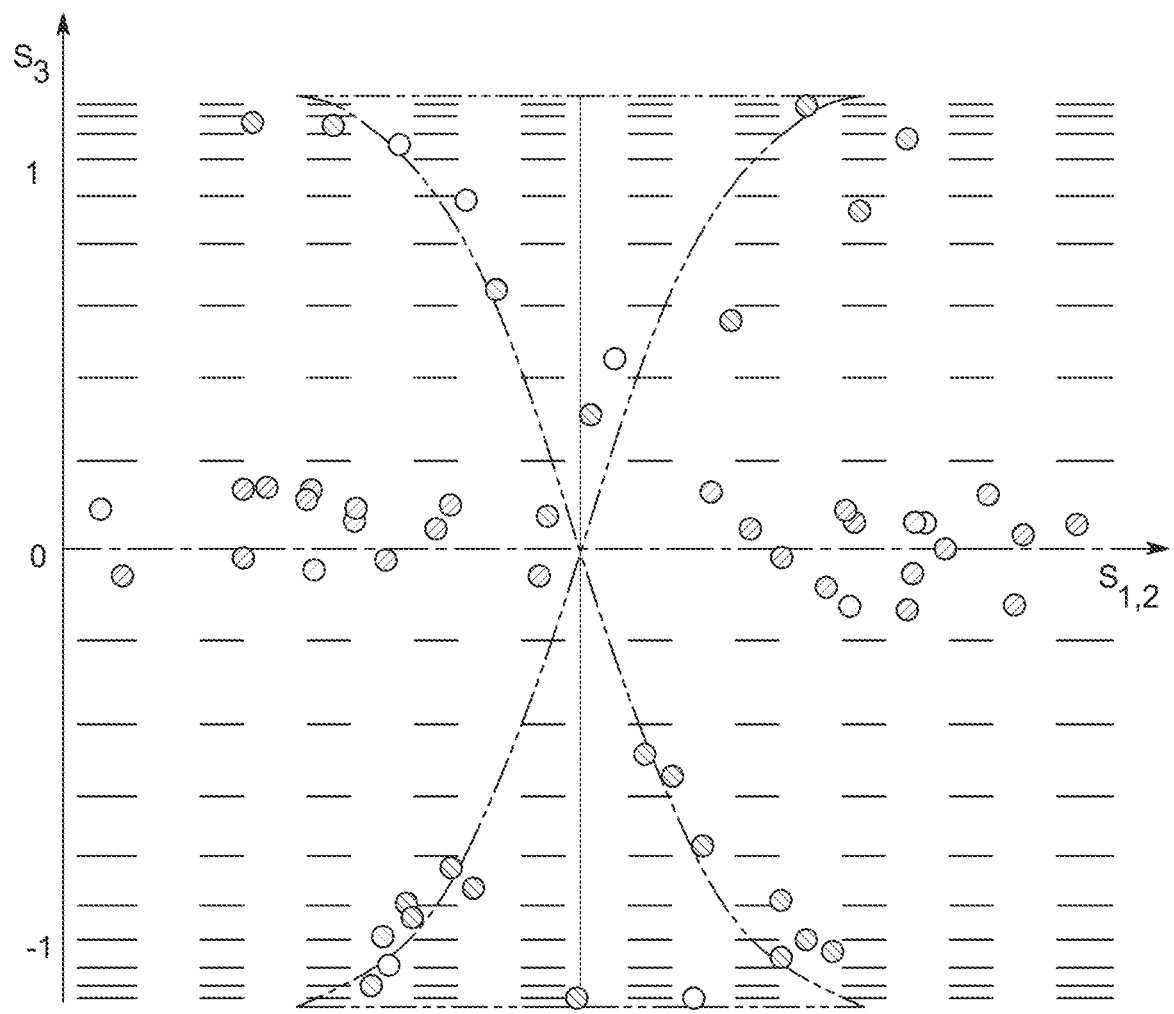
FIG. 14 shows a Mercator projection of the Poincaré sphere of FIG. 13, according to aspects of the present disclosure.

To clarify this aspect further, the Poincaré sphere was planarized using Mercator projection displayed in FIG. 14. The measured results (dark dots/squares for QWP/HWP, respectively) closely follow the reference marks, yielding root mean square error values for $S_1$, $S_2$, and $S_3$ as 0.2103, 0.2646, and 0.1003, respectively. Many factors, ranging from fabrication imperfections to calibration uncertainties, contribute to the deviation from an optimal response. For example, the angular misalignment between the Weyl semimetal slide and the rest of the device (like that shown in FIG. 8), or the variation of the thickness of the Weyl semimetal slides (which is to some extent inevitable using the FIB approach), as well as the variation in light landing position on the three patterns, all contribute to the observed error.

Using the unique circular polarization photo response of Weyl semimetal TaAs thin slides allows for the design and fabrication of the 3-unit integrated polarimeter disclosed herein, featuring grating-based wave plates and Weyl semimetal slides. The disclosed polarimeter design brings several advantages, which include ultracompact form factor (without requiring additional photodetectors), high speed, and broadband operation. Since polarization dependent photocurrents from Weyl semimetals, such as TaAs, stem from CPGE-PTE coupled mechanisms, and given the gapless nature of Weyl cones and the broad absorption spectrum of TaAs, the observed photo response is expected to be spectrally broadband. In fact, there is the presence of strong CPGE at a wavelength of 10.6 µm and such behavior can even be observed at terahertz (THz) bands. The grating-based wave plates used in this design are wavelength dependent, but since the absolute value of retardation does not particularly change the physics of the device, the system can be readily calibrated for different wavelengths. This broadband response is a valuable feature, especially in the mid-IR range where detector choice is still limited. The 3-unit polarimeter design of the present disclosure presents a general strategy to exploit materials with polarization dependent photocurrent.

Any material responding to one or multiple polarization Stokes parameters $S_{1,2,3}$ could replace TaAs in the system. The 3-unit polarimeter design of the present disclosure sensing structure can be used as a building block for pixelized imaging polarimetric camera. Thus, Weyl semimetals can provide a new paradigm for future optical sensing and imaging.

Figure 15:
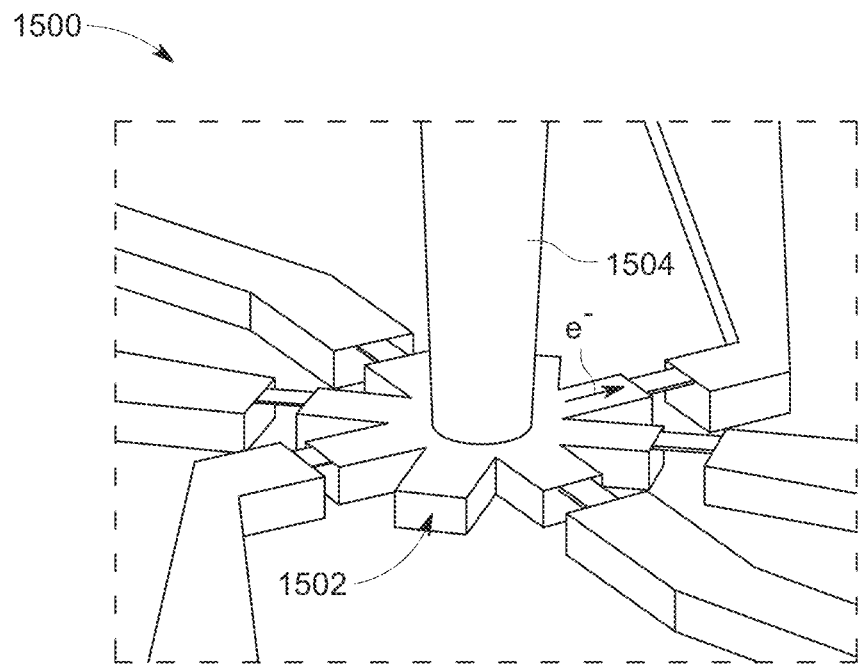
FIG. 15 shows a schematic view of a Weyl single-unit multi-port integrated polarimeter, according to aspects of the present disclosure.

In addition to the 3-unit integrated polarimeter, the present disclosure also provides for a Weyl semimetal single-unit multi-port integrated polarimeter. Specifically, FIG. 15 shows a schematic view of a Weyl single-unit multi-port integrated polarimeter 1500, according to aspects of the present disclosure. The Weyl single-unit multi-port integrated polarimeter 1500 can have an overall size of about 35 by about 35 µm and have a thickness of about 4 µm. However, the dimensions can vary.

Figure 16:
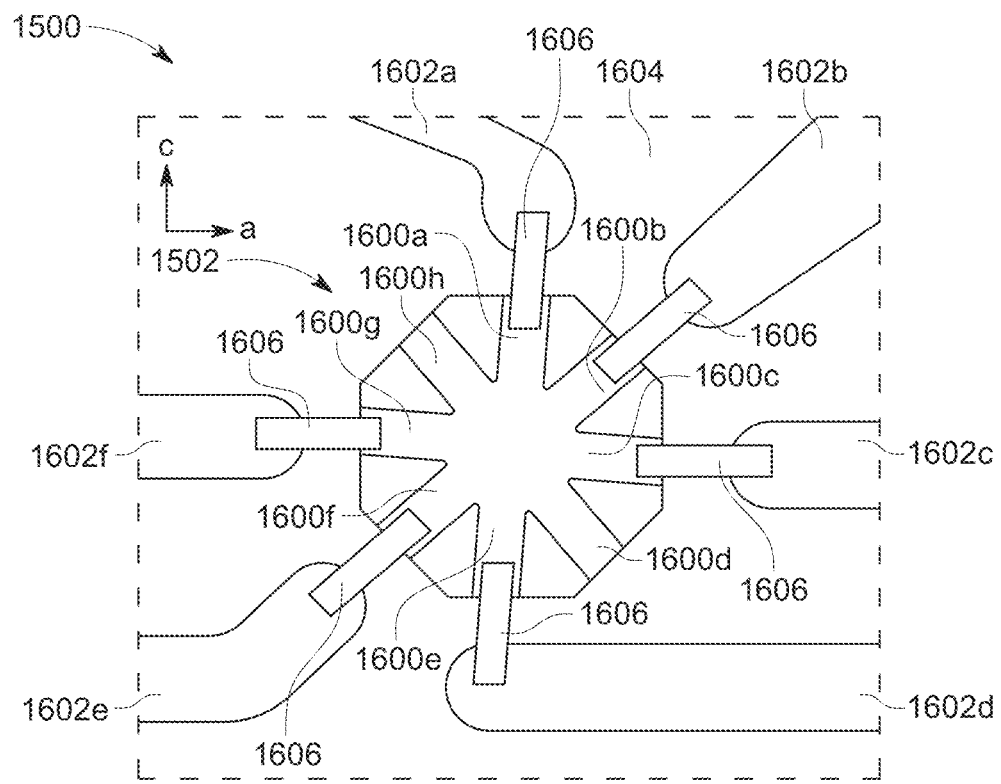
FIG. 16 shows a top view of a Weyl semimetal single-unit multi-port polarimeter, according to aspects of the present disclosure.

The Weyl semimetal slide 1502 is in the shape of a snowflake. Light 1504 incident on the Weyl semimetal slide 1502 generates a current, as represented by the electron e. Referring to FIG. 16, the Weyl semimetal slide 1502 includes radial arms 1600a-1600h. The arms 1600a-1600h generally are spaced evenly and radially apart. The arms 1600a-1600c and 1600e-1600g are connected to electrodes 1602a-1602f, respectively. Although eight arms are shown, according to some aspects, the Weyl semimetal slide 1502 can have only four arms. Four arms is sufficient because four arms can provide six different electrode pairs, while the polarization measurement only requires three different electrode pairs. Six arms, however, are more practical for the Weyl semimetal slide 1502 in practice. Similar to above, the a-c plane of the crystal structure shown in FIG. 16, such as of the TaAs crystal structure, is placed parallel to the substrate 1604. The substrate 1604 can be silicon/silicon dioxide, as disclosed above for the similar substrate. The arms 1600a-1600c and 1600e-1600g are connected to the electrodes 1602a-1602f via welds 1606, which can be platinum, as disclosed above for the similar welds. Although the arms 1600d and 1600h are not connected to electrodes, according to some embodiments, these arms 1600d and 1600h also can be connected to electrodes.

When the Weyl semimetal slide 1502 is illuminated by a coherent light beam with a specific polarization state, its current response can be characterized by a 4×4 matrix:

$$\begin{bmatrix} 1 \\ J_2 \\ J_3 \\ J_4 \end{bmatrix} = \begin{bmatrix} 1 & 0 & 0 & 0 \\ M_{21} & M_{22} & M_{23} & M_{24} \\ M_{31} & M_{32} & M_{33} & M_{34} \\ M_{41} & M_{42} & M_{43} & M_{44} \end{bmatrix} \begin{bmatrix} 1 \\ S_1 \\ S_2 \\ S_3 \end{bmatrix} \quad \text{(Eq. 3)}$$

where $J_2$, $J_3$, and $J_4$ are the currents measured from the respective electrode pairs of (1602f, 1602b), (1602a, 1602c), and (1602f, 1602c), respectively, from FIG. 16, and $S_1$, $S_2$, and $S_3$ are normalized Stokes parameters. For the detection process, this matrix of Equation 3 is first calibrated by four known polarization states, then the system is ready to reveal the Stokes parameters of any input pure polarizations by simply measuring the current components.

Figure 17:
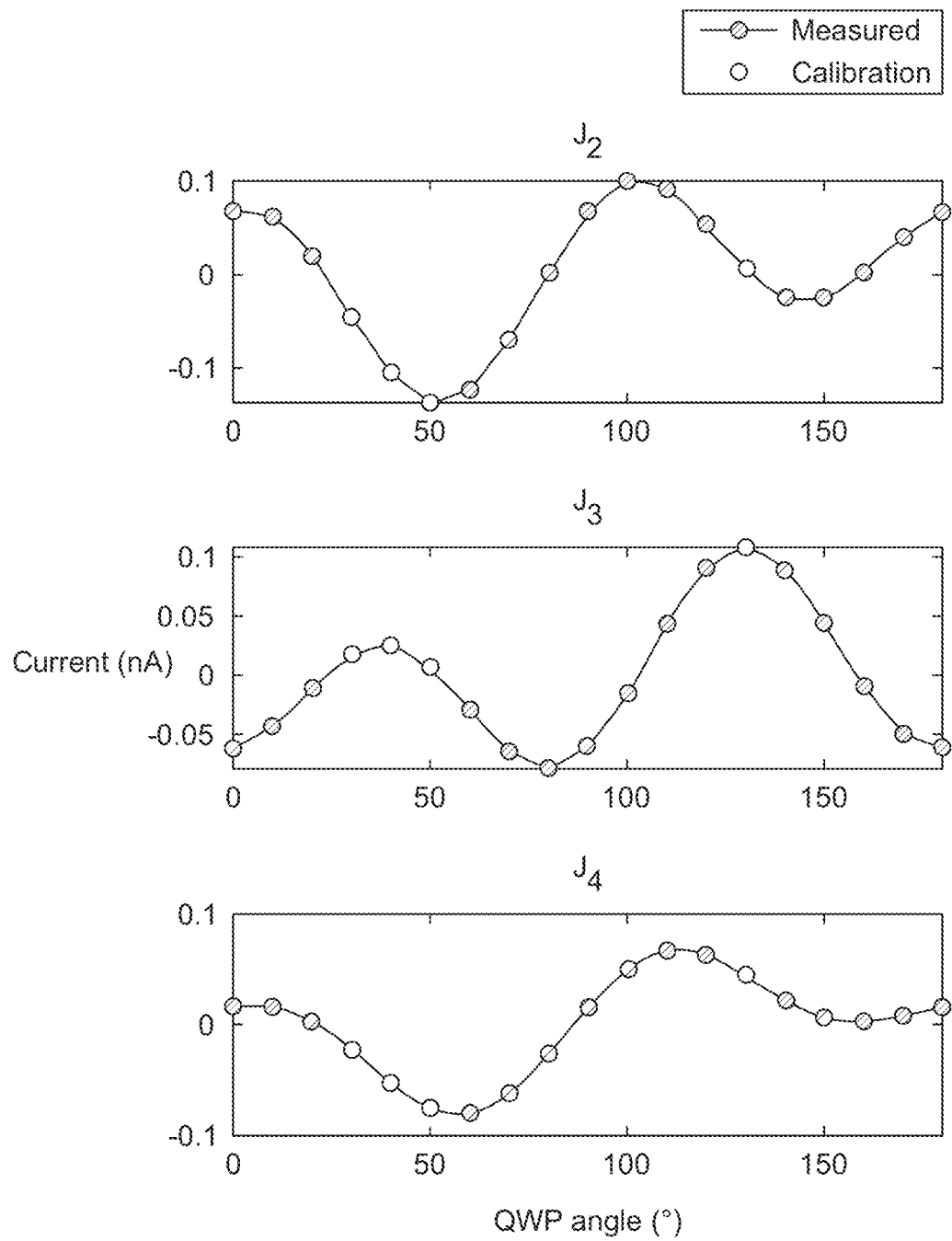
FIG. 17 shows plots of currents obtained by altering polarization by rotating a quarter wave plate, according to aspects of the present disclosure.

FIG. 4 also represents the setup used for performing material characterization and polarization detection, according to aspects of the present disclosure. A quarter wave plate (QWP) was used to alter the polarization of the laser beam. By rotating the QWP from 0° to 180° in the steps of 10°, 19 groups of currents ($J_2$, $J_3$, $J_4$) were obtained and shown in FIG. 17. Four of the currents are randomly selected for calibrating the matrix and the remaining 15 are used for testing. The circles and squares respectively denote measured data and calibration basis.

Figure 18:
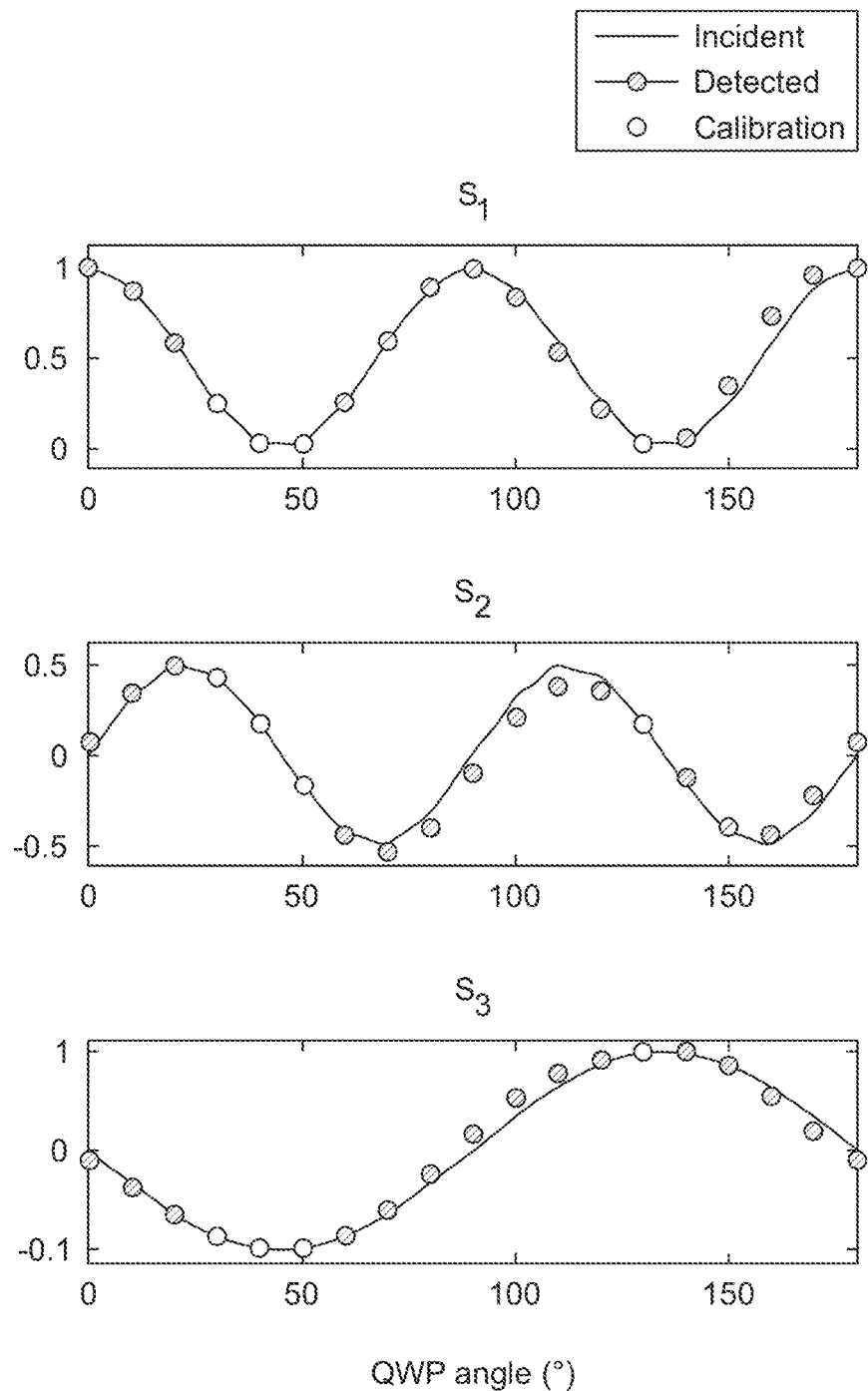
FIG. 18 shows incident and detected Stokes parameters based on the information shown in FIG. 17, according to aspects of the present disclosure.
Figure 19:
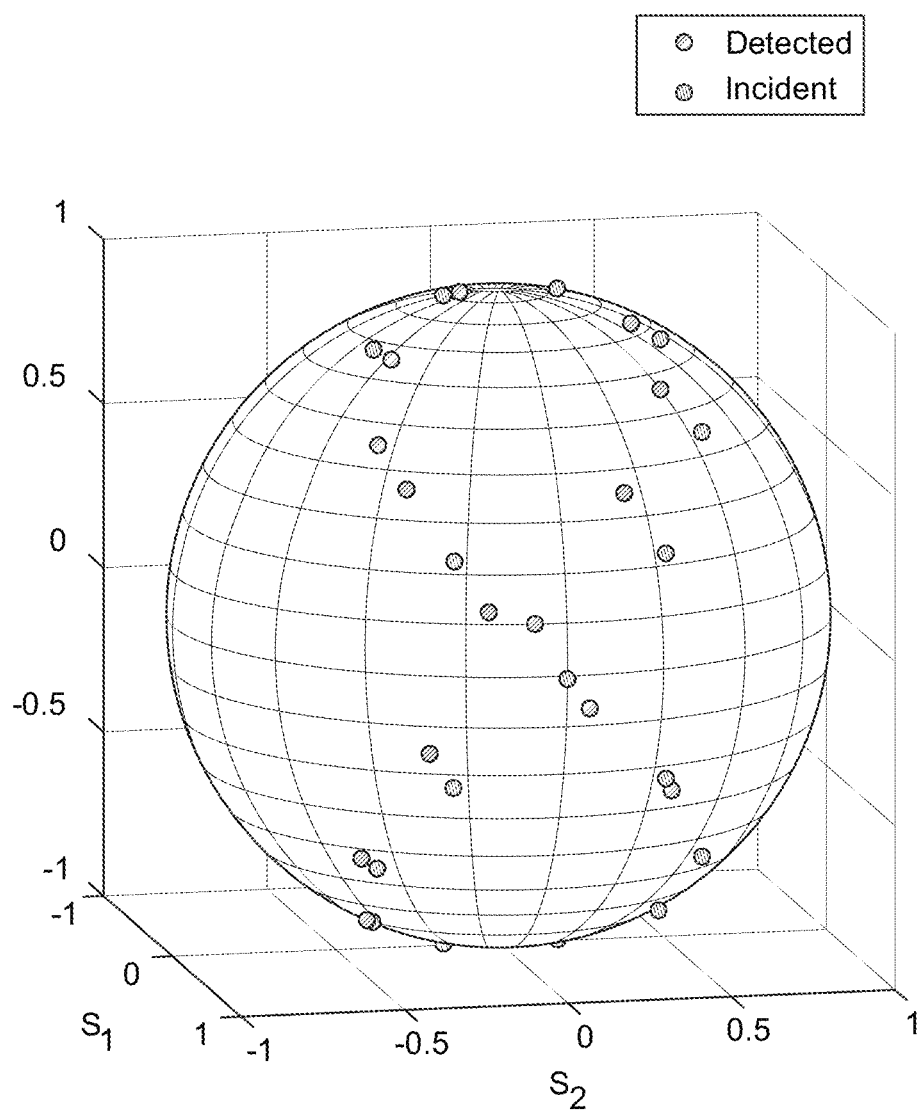
FIG. 19 shows the corresponding positions of the incident and detected Stokes parameters from FIG. 18 on a Poincaré sphere, according to aspects of the present disclosure.

FIGS. 18 and 19, respectively, show the incident and detected Stokes parameters ($S_1$, $S_2$, $S_3$) and their corresponding positions on the Poincaré sphere, respectively, which reveals a minute average error of around 5%. In FIG. 18, the circles and squares denote detected data and calibration basis, respectively, and the curves represent the incident polarization states.

Figure 20:
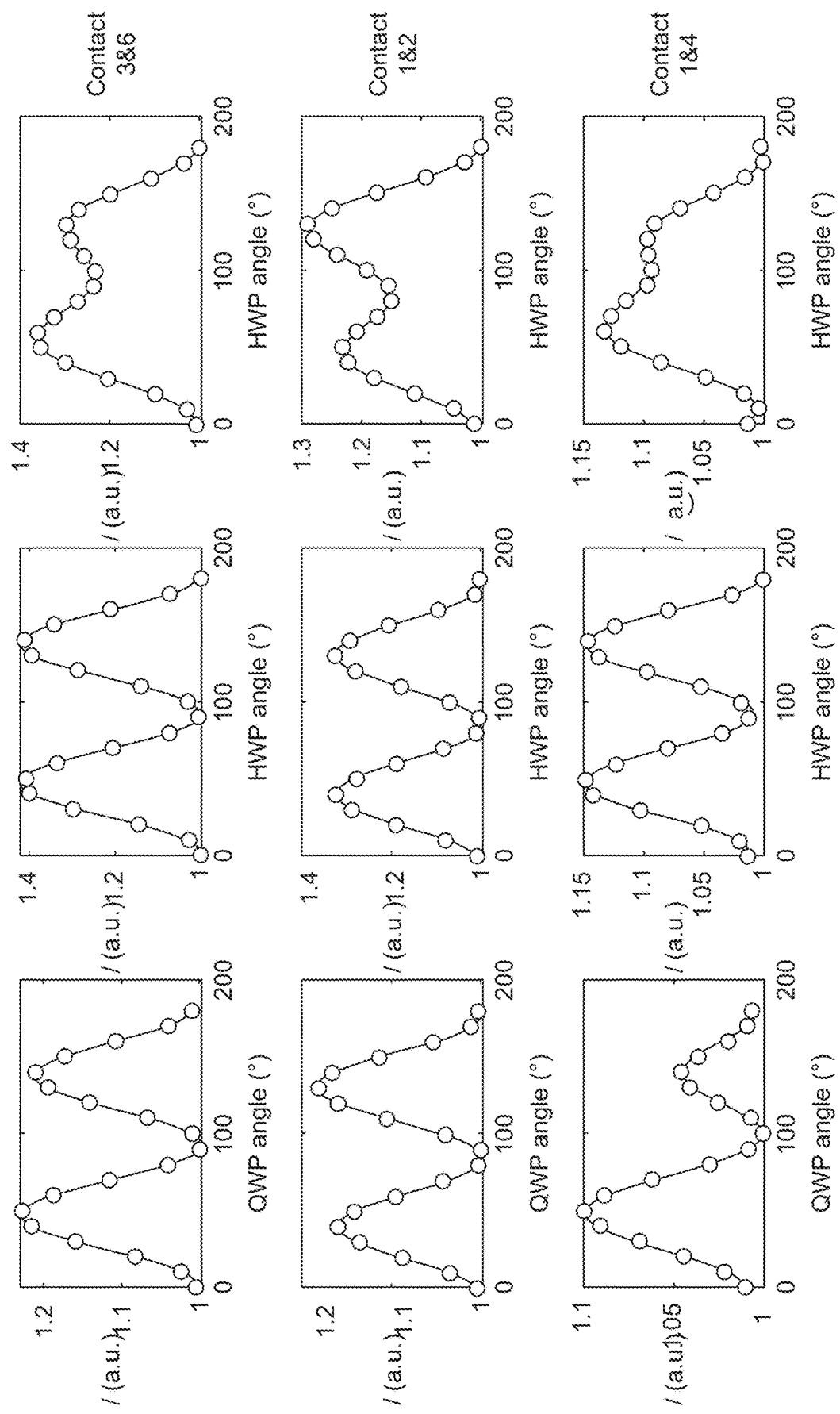
FIG. 20 shows plots of currents obtained by altering polarization by rotating both a quarter wave plate and a half wave plate, according to aspects of the present disclosure.

Referring to FIG. 20, shown are plots of measured electric currents (dots) and their fitting curves (lines), versus the rotation angles of quarter wave plate (QWP) and half wave plate (HWP). Each row in FIG. 20 shows the measured currents (dots) from one specific electrode pair m and n, i.e., the current is detected from contact m and n. Specifically, the first row of three plots are for the electrode pair 1602c and 1602f, the second row of three plots are for the electrode pair 1602a and 1602b, and the third row of three plots are for the electrode pair 1602a and 1602d.

Each column of FIG. 20 shows the measured currents (dots) under one specific rotation rule of HWP and QWP. The rotation of HWP and QWP for column 1 is QWP rotation only, HWP is fixed to 0°. The rotation of HWP and QWP for column 2 is QWP angle equals two times the HWP angle. The rotation of HWP and QWP for column 3 is QWP angle equals one-half times the HWP angle.

Figure 21:
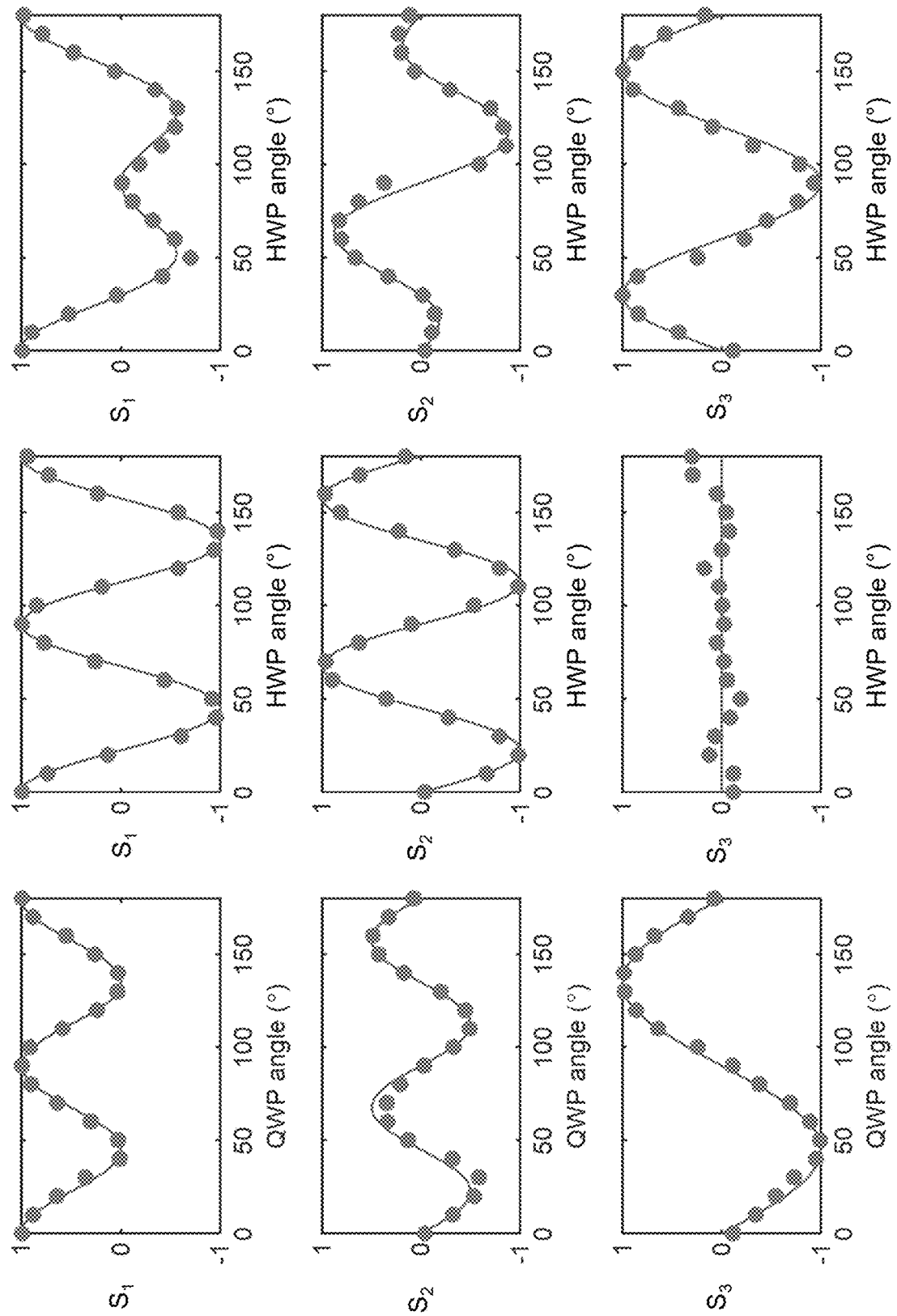
FIG. 21 shows the fully reconstructed Stokes parameters using the data shown in FIG. 20, according to aspects of the present disclosure.
Figure 22:
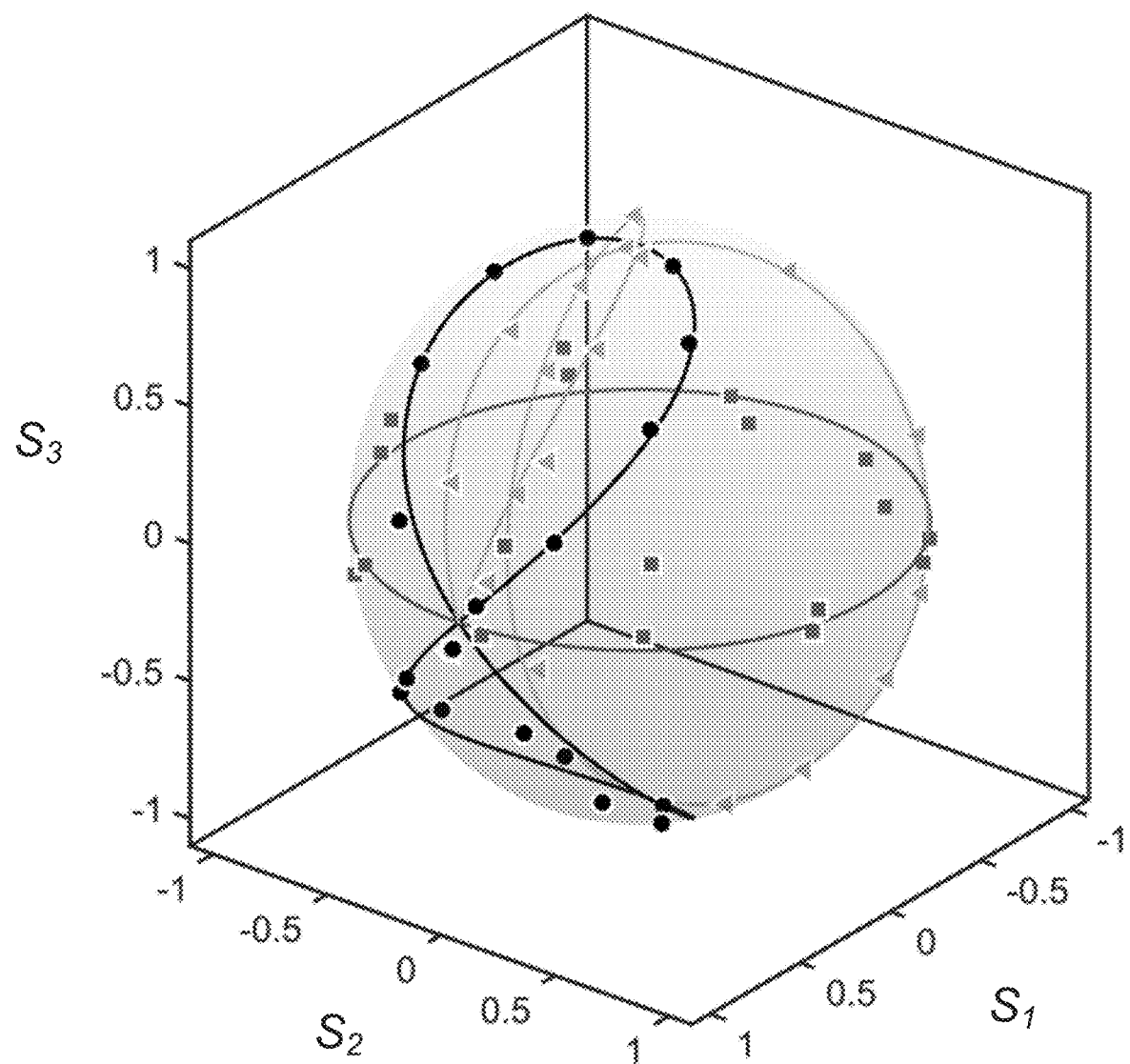
FIG. 22 shows the Stokes parameters from FIG. 21 plotted onto the Poincare sphere, according to aspects of the present disclosure.

Referring to FIG. 21, the reconstructed Stokes parameters using the electric current data shown in FIG. 22 are shown in various plots. The curves are the expected values, and the dots are the measured values. Each row of FIG. 21 shows the different Stokes parameter values, respectively $S_1$, $S_2$, and $S_3$. Each column of FIG. 21 shows the results under one specific rotation rule of HWP and QWP. Columns 1, 2, and 3 correspond to columns 1, 2, and 3, respectively, in FIG. 20.

Referring to FIG. 22, the measured Stokes parameters from FIG. 21 are plotted onto the Poincare sphere. The measured values, depicted by dots, squares and triangles corresponding to the three specific rotation rules of HWP and QWP, follow closely to the reference states (curves respectively in the same gray scales). The dots, squares and triangles correspond respectively to columns 1, 2, 3 in FIG. 20.

One skilled in the art will recognize many methods and materials similar or equivalent to those described herein, which could be used in the practice of the present invention. Indeed, the present invention is in no way limited to the methods and materials described. For purposes of the present invention, the following terms are defined below.

Various embodiments of the invention are described above in the Detailed Description. While these descriptions directly describe the above embodiments, it is understood that those skilled in the art may conceive modifications and/or variations to the specific embodiments shown and described herein. Any such modifications or variations that fall within the purview of this description are intended to be included therein as well. Unless specifically noted, it is the intention of the inventors that the words and phrases in the specification and claims be given the ordinary and accustomed meanings to those of ordinary skill in the applicable art(s).

The foregoing description of various embodiments of the invention known to the applicant at this time of filing the application has been presented and is intended for the purposes of illustration and description. The present description is not intended to be exhaustive nor limit the invention to the precise form disclosed and many modifications and variations are possible in the light of the above teachings. The embodiments described serve to explain the principles of the invention and its practical application and to enable others skilled in the art to utilize the invention in various embodiments and with various modifications as are suited to the particular use contemplated. Therefore, it is intended that the invention not be limited to the particular embodiments disclosed for carrying out the invention.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.).

What is claimed is:

1. An integrated polarimeter comprising:
   three or fewer Weyl semimetal sensing units; and
   two or fewer integrated grating-based wave plates, with each one of two of the three or fewer Weyl semimetal sensing units on a separate one of the two or fewer integrated grating-based wave plates.

2. The polarimeter of claim 1, wherein the Weyl semimetal is tantalum-arsenic.

3. The polarimeter of claim 1, wherein the integrated grating-based wave plates are silicon on silicon dioxide.

4. The polarimeter of claim 3, wherein the integrated grating-based wave plates are patterned and etched on the silicon on silicon dioxide.

5. The polarimeter of claim 1, wherein the integrated grating-based wave plates have different effective refractive indexes for transverse electric waves and transverse magnetic waves.

6. The polarimeter of claim 1, wherein each one of the three or fewer Weyl semimetal sensing units is a 35 μm long TaAs thin slide, and each one of the two or fewer integrated grating-based wave plates is a 2-μm-period grating underneath.

7. The polarimeter of claim 1, further comprising pairs of electrodes, wherein each one of the three or fewer Weyl semimetal sensing units extends between a separate one of the pairs of electrodes.

8. The polarimeter of claim 7, wherein the a-c plane of Weyl semimetal crystal structure of the three or fewer Weyl semimetal sensing units is oriented on a substrate surface such that an axis a is along a line connecting the pairs of electrodes.

9. The polarimeter of claim 1, wherein the two or fewer integrated grating-based wave plates are 45° rotated with respect to each other.

10. The polarimeter of claim 1, wherein the polarimeter has three Weyl semimetal sensing units.

11. The polarimeter of claim 1, wherein the polarimeter has one Weyl semimetal sensing units.

12. A method of forming a Weyl semimetal sensing unit comprising:
- milling a Weyl semimetal slide;
- transferring the milled Weyl semimetal slide to a thermally grown silicon dioxide on silicon substrate using focused an ion beam technique; and
- electrically bridging with platinum the transferred Weyl semimetal slide on the silicon dioxide on silicon substrate to electrodes.

13. A single-unit multi-port integrated polarimeter comprising:
- a substrate;
- a Weyl semimetal slide on the substrate, the Weyl semimetal slide having at least four arms;
- a plurality of electrodes on the substrate, each electrode is associated with a separate arm of the at least four arms of the Weyl semimetal slide; and
- conductive welds separately connecting the plurality of electrodes to the at least four arms.

14. The polarimeter of claim 13, wherein the substrate is silicon oxide on silicon substrate.

15. The polarimeter of claim 13, wherein the Weyl semimetal is fabricated as a snow-flake shape.

16. The polarimeter of claim 13, wherein the Weyl semimetal is tantalum-arsenic.

17. The polarimeter of claim 13, wherein the at least four arms is eight arms.

18. The polarimeter of claim 17, wherein the eight arms are evenly radially spaced apart.

19. The polarimeter of claim 18, wherein the plurality of electrodes are six electrodes.

20. The polarimeter of claim 19, wherein two of the eight arms are not connected directly to any one of the six electrodes.

\* \* \* \* \*